United States Patent
Sievenpiper et al.

(10) Patent No.: US 7,546,146 B2
(45) Date of Patent: Jun. 9, 2009

(54) CONTROL SYSTEM AND METHOD FOR DIVERSITY ANTENNA SYSTEM

(75) Inventors: Daniel F. Sievenpiper, Santa Monica, CA (US); Hui-Pin Hsu, Northridge, CA (US); Timothy J. Talty, Beverly Hills, MI (US); John Pasiecznik, Jr., Malibu, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 159 days.

(21) Appl. No.: 11/199,809

(22) Filed: Aug. 9, 2005

(65) Prior Publication Data

US 2006/0172712 A1 Aug. 3, 2006

Related U.S. Application Data

(60) Provisional application No. 60/648,855, filed on Feb. 1, 2005.

(51) Int. Cl.
 H04B 7/185 (2006.01)
 H04W 4/00 (2009.01)
(52) U.S. Cl. ............... 455/562.1; 455/13.3; 370/334
(58) Field of Classification Search ............... None
 See application file for complete search history.

(56) References Cited

U.S. PATENT DOCUMENTS

| | | | |
|---|---|---|---|
| 3,329,901 A * | 7/1967 | Case ................... 455/277.1 |
| 4,823,142 A | 4/1989 | Ohe et al. ................ 343/713 |
| 5,276,920 A | 1/1994 | Kuisma ................... 455/101 |
| 5,329,555 A * | 7/1994 | Marko et al. ............ 375/347 |
| 5,859,842 A * | 1/1999 | Scott ...................... 370/342 |
| 5,991,643 A * | 11/1999 | Chao-Cheng .......... 455/575.7 |
| 6,035,183 A * | 3/2000 | Todd et al. ............ 455/226.2 |
| 6,108,526 A * | 8/2000 | van der Plas .............. 455/78 |
| 6,400,334 B1 | 6/2002 | Lindenmeier et al. .... 343/850 |
| 6,407,719 B1 | 6/2002 | Ohira et al. ............... 343/893 |
| 6,556,807 B1 * | 4/2003 | Horie et al. ............. 455/3.02 |
| 6,768,457 B2 | 7/2004 | Lindenmeier ............ 342/374 |
| 2002/0104879 A1 * | 8/2002 | Wohl et al. .............. 235/380 |
| 2005/0130606 A1 * | 6/2005 | Wang et al. .............. 455/101 |
| 2005/0276239 A1 * | 12/2005 | Smallcomb et al. ...... 370/316 |

* cited by examiner

*Primary Examiner*—Nick Corsaro
*Assistant Examiner*—Joel Ajayi

(57) ABSTRACT

A control system and method for controlling switching between and among multiple antennas in a diversity antenna system comprising a radio head unit associated with a radio receiver; two or more antennas, either located in separate antenna modules or co-located in the same antenna module; a switch circuit; and a single cable. Control signals for controlling switching are provided as changes in a DC power supply signal carried on the single cable. In the case of multiple antenna modules, the radio head unit and the antenna modules are connected by the single cable using a daisy-chain architecture.

16 Claims, 5 Drawing Sheets

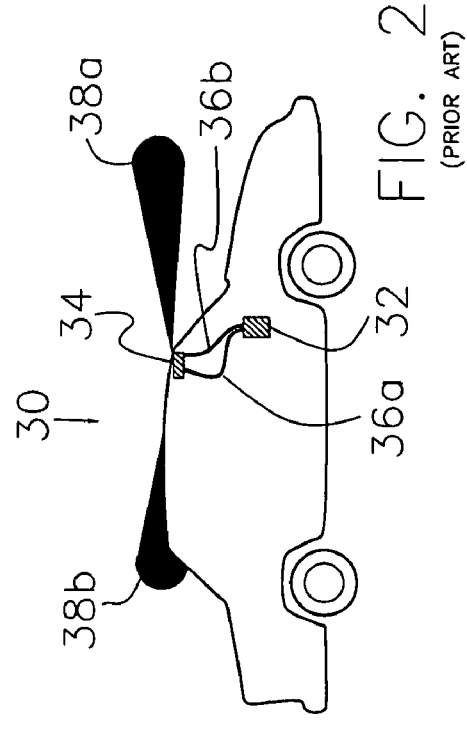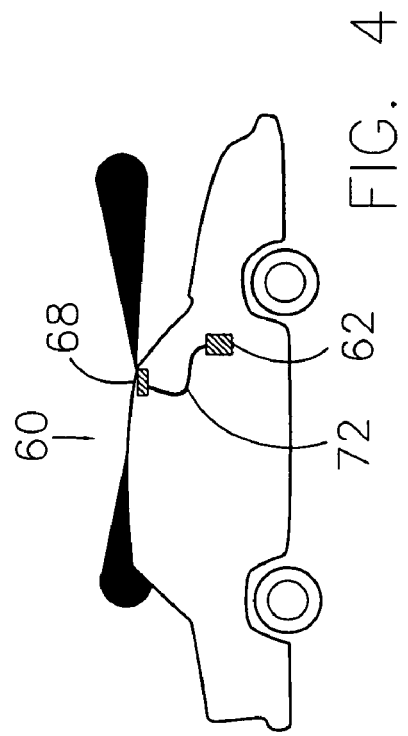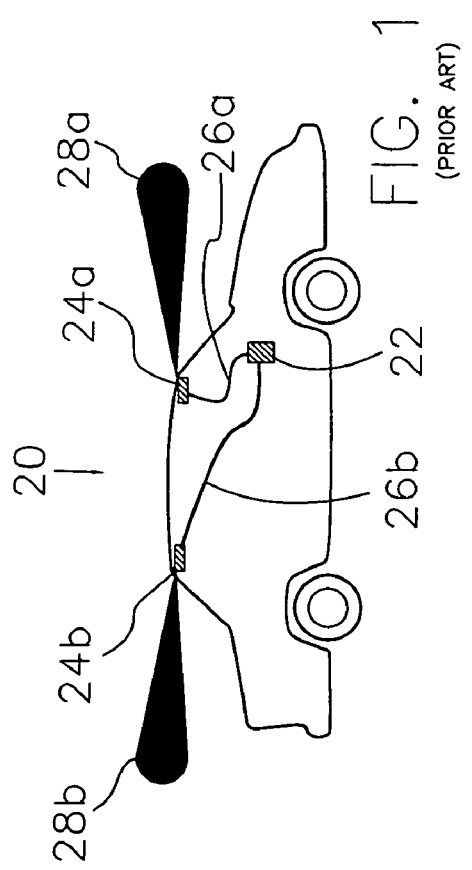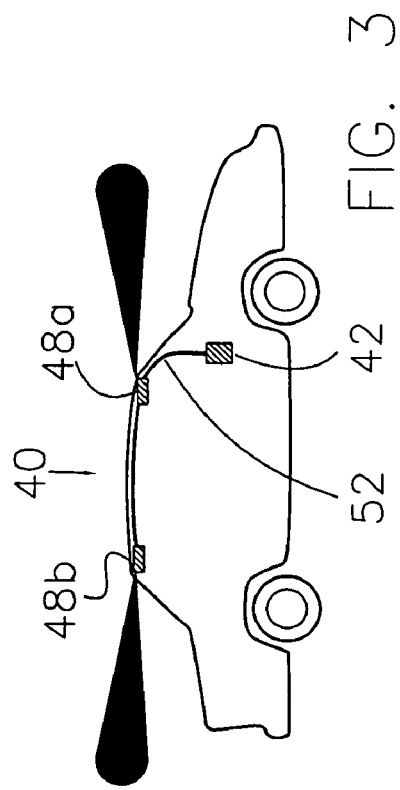

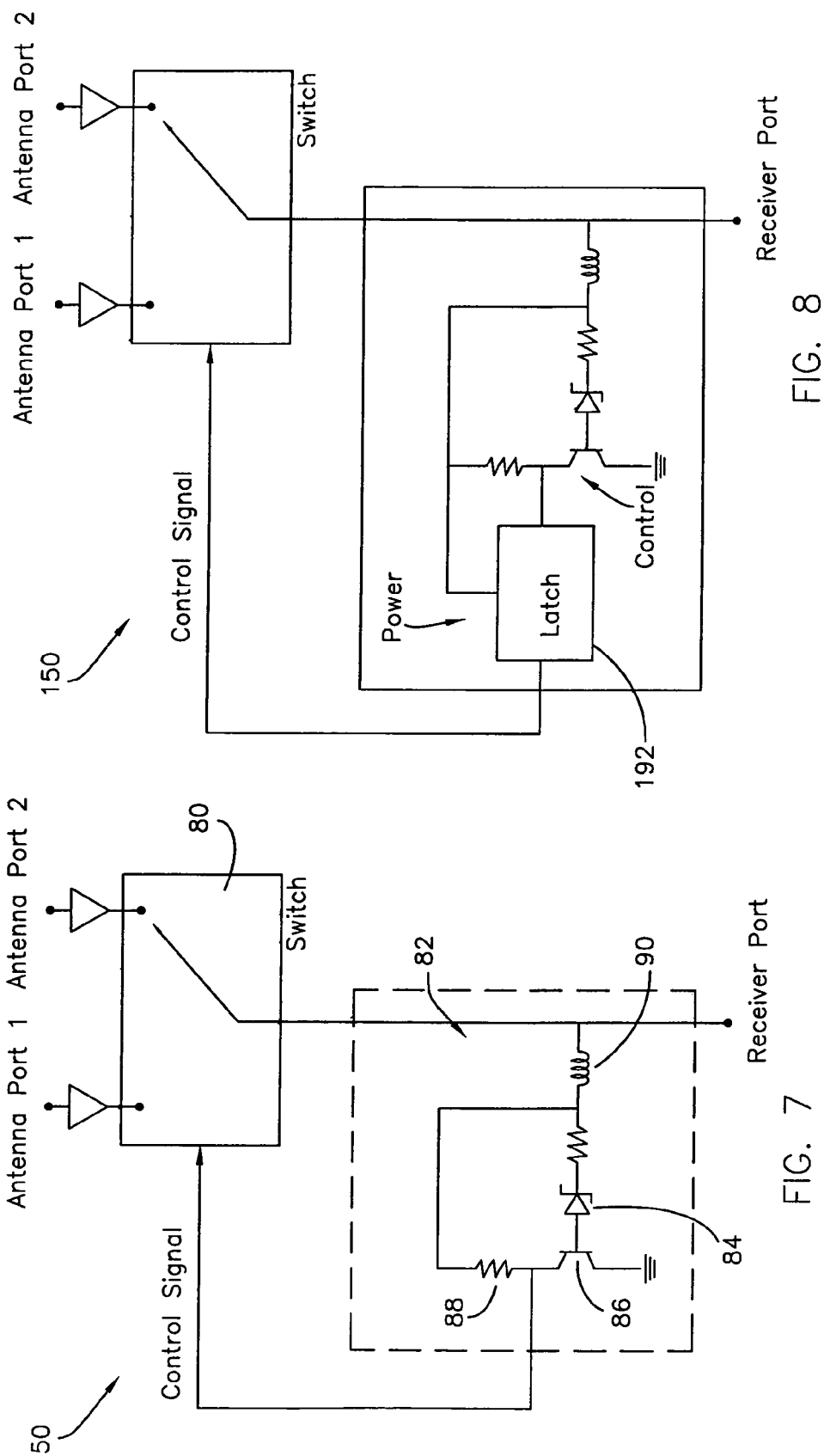

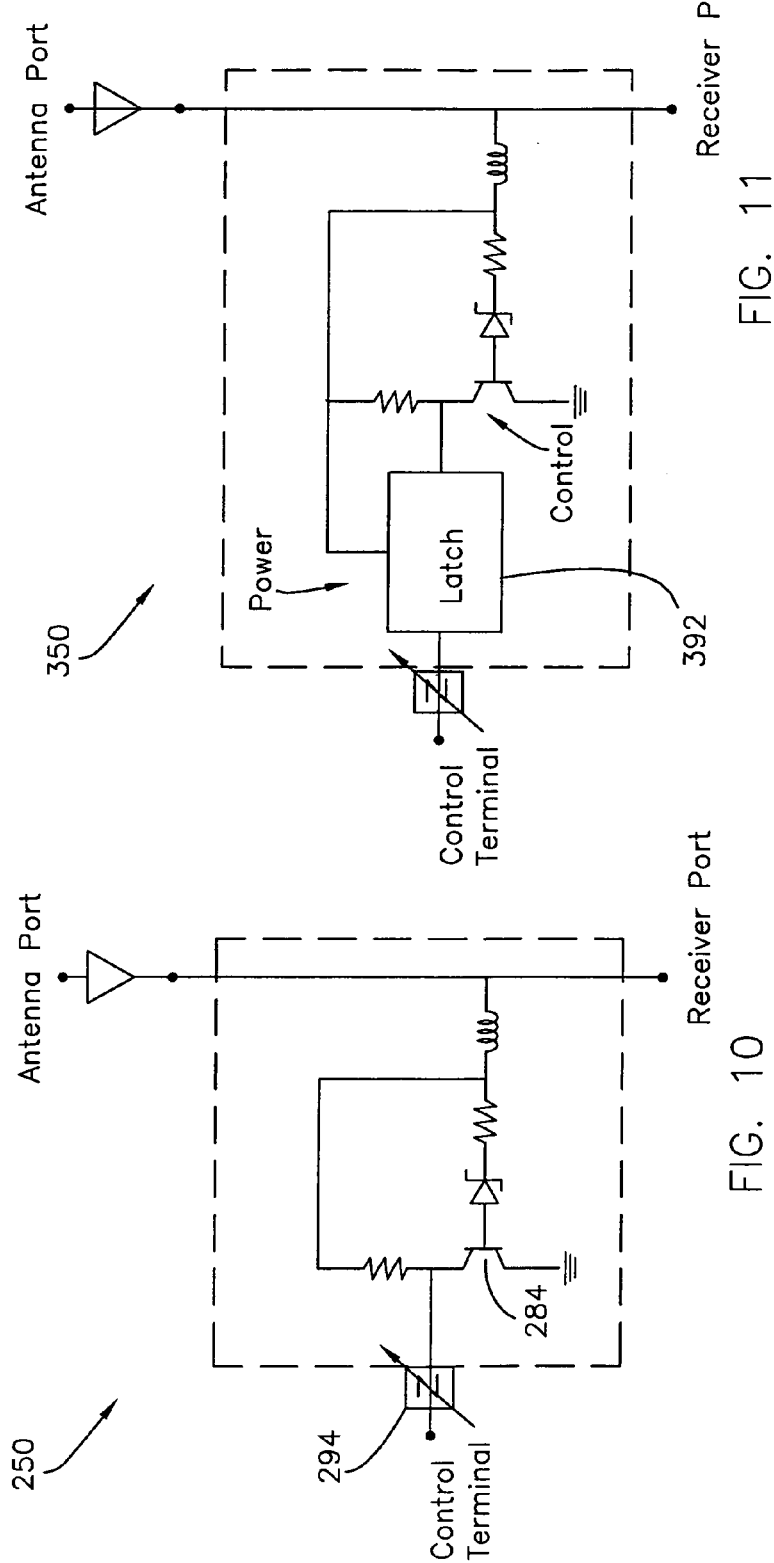

CONTROL SYSTEM AND METHOD FOR DIVERSITY ANTENNA SYSTEM

CROSS REFERENCE TO RELATED APPLICATION

This application claims priority to U. S. Provisional No. 60/648,855 filed on Feb. 1, 2005.

TECHNICAL FIELD

The present invention relates to systems and methods for controlling switching between and among multiple antennas in diversity antenna systems.

BACKGROUND OF THE INVENTION

It is known that reception of radio-frequency (RF) signals can be improved through a diversity technique using multiple antennas to maximize the signal quality of the received signals. The signals from the different antennas can be combined in a variety of ways, but the simplest is to switch between and among the several antennas in order to identify and select the particular antenna providing the strongest signal. Such switching is typically accomplished using an RF switch, and selection of the particular antenna may be based on such measures of signal quality as, for example, higher received power or lower bit error rate. The best performance in a diversity antenna system is obtained by switching based on bit error rate, which avoids erroneous signal power measurements that can be caused by interfering signals. In order to minimize cost and simplify construction, it is often desirable to use a blind switching system based on a threshold bit error rate value and measuring the bit error rate only for the antenna that is currently selected. If the bit error rate exceeds the pre-established threshold value, then the diversity switch selects a different antenna. This system is based on the assumption that the signal from the different antenna cannot be worse than the signal from the currently-selected antenna because the latter is already performing at or below the threshold value and therefore providing unacceptable signal quality. If the two antennas are statistically independent, then there is a good chance that the different antenna will provide a stronger signal. This is known as diversity gain. The different antenna could provide worse reception, but all signals below the threshold value are considered to be equally unacceptable, particularly for digital systems. By optimizing the pre-established threshold value, such a system can perform nearly as well as a system that measures bit error rates for both antennas simultaneously, while eliminating redundant hardware.

Referring to FIGS. 1 and 2, prior art diversity systems 20,30 typically comprise a radio receiver 22,32; two or more antennas located either in separate antenna modules 24a,24b, as shown in FIG. 1, or in the same antenna module 34, as shown in FIG. 2; and separate cables extending between each antenna and the radio receiver 26a,26b,36a,36b. Optimum performance is achieved when the antennas have complimentary radiation patterns 28a,28b,38a,38b. This be achieved either by physically positioning the antennas such that their radiation patterns 28a,28b and maximum gain are in opposite directions, such as at and toward the front and rear of a vehicle, as shown in FIG. 1, or by co-locating and combining the antennas to produce the complimentary radiation patterns 38a,38b, as shown in FIG. 2. The latter implementation can be accomplished by adding the signals from antennas with different phases, such as, for example, by combining two antennas that are separated by one-half wavelength with a phase difference of either 0° or 180° to produce sum and difference patterns which are complimentary.

Choosing between a diversity antenna system architecture with multiple antenna modules, each having a single antenna, and a system architecture with a single antenna module having multiple antennas often depends on such practical considerations and constraints as hardware and installation costs, vehicle design, and antenna placement, and may not depend on maximizing performance. For example, diversity is often used to achieve only nominal performance which is no better than that provided by a single omnidirectional antenna, but using two antennas that are hidden to preserve the integrity of the vehicle's style. Each of these hidden antennas can have lower performance requirements than the single omnidirectional antenna, and can therefore be integrated more easily into a vehicle or hidden within the vehicle structure.

In each of the two aforementioned diversity antenna system architectures, switching between and among the antennas is performed at the radio receiver 22,32, which requires the separate cables 26a,26b,36a,36b extending between the receiver 22,32 and each of the antennas, resulting in both a multiplicity of cables and a corresponding number of RF antenna connectors at the receiver 22,32. The cost of RF coaxial cable is calculated based on length, and, particularly in a large-scale structure such as a vehicle, the cost of this multiplicity of cables can approach the cost of the antenna modules. Furthermore, packaging and routing the many cables can be time-consuming and labor-intensive.

Prior art diversity control systems are possible that use a lesser number of cables, but these systems rely on undesirably complex, large, or costly technology, such as filtering mechanisms, and complex control signals to switch between antennas.

Due to these and other problems and limitations in the prior art, an improved control system and method for controlling switching in diversity antenna systems is needed.

SUMMARY OF THE INVENTION

The present invention overcomes the above-described and other problems and disadvantages in the prior art by providing an improved control system and method for controlling switching between and among antennas in a diversity antenna system comprising a radio head unit associated with a radio receiver; two or more antennas, either located in separate antenna modules or co-located in the same antenna module; a switch circuit; and a single cable. Control signals for controlling switching are provided as changes in a DC power supply signal carried on the single cable. In the case of multiple antenna modules, the radio head unit and the antenna modules are connected by the single cable using a daisy-chain architecture.

More specifically, the radio head unit is adapted to determine, based on such factors as, for example, signal strength, bit error rate, or noise level of an RF signal received from a currently-selected one of the antennas, whether the currently selected antenna is providing a signal of acceptable quality, and, if the antenna is not, to generate a control signal to cause the switch circuit to switch to the other antenna. The control signal is provided as a minor change or perturbation in the DC power supply signal provided via the single cable to the antenna module(s).

The switch circuit detects the control signal and switches between and among the antennas, and includes an RF switch and a switch controller. The RF switch is a single-pull, double-throw switch that switches in response to a switch signal provided by the switch controller. The switch controller includes a voltage limiting device and a current amplifying device for extracting the control signal from the DC power supply signal carried on the single cable from the radio head unit, and for generating, in response to the detected control signal, the switch signal that actuates the RF switch.

The single cable carries the received RF signals from the antennas to the radio head unit, and carries the DC power supply signal, including the control signal, from the radio head unit to the antenna module(s).

Thus, it will be understood and appreciated that the present invention provides a number of advantages over the prior art, including, for example, using a single cable rather than multiple cables, which facilitates packaging and installation, including reducing problems associated with routing cables. Use of a single cable also lowers costs, particularly costs associated with the total length of cable needed to connect the receiver and the antenna module(s). Use of a single cable also eliminates multiple RF antenna connectors at the receiver.

These and other features of the present invention are discussed in greater detail in the section below titled DESCRIPTION OF THE PREFFERED EMBODIMENT(S).

BRIEF DESCRIPTION OF THE DRAWINGS

A preferred embodiment of the present invention is described in detail below with reference to the attached drawing figures, wherein:

FIG. 1 is a depiction of a first prior art diversity antenna system wherein a separate cable is used to connect each of two antenna modules to a radio receiver, resulting in a multiplicity of cables;

FIG. 2 is a depiction of a second prior art diversity antenna system wherein a separate cable is used to connect each of two antennas, co-located within a single antenna module, to a radio receiver, also resulting in a multiplicity of cables;

FIG. 3 is a depiction of a first diversity antenna system using the control system of the present invention wherein a single cable is used to connect each of two antenna modules to a radio receiver using a daisy-chain architecture; and FIG. 4 is a depiction of a second diversity antenna system using the control system of the present invention wherein a single cable is used to connect each of two antennas, co-located within a single antenna module, to a radio receiver;

FIG. 7 is a circuit diagram of a first implementation of a switch circuit component of the control system of the present invention for use in the diversity antenna systems of FIGS. 5 and 6;

FIG. 8 is a circuit diagram of a second implementation of the switch circuit component of the control system of the present invention for use in the diversity antenna systems of FIGS. 5 and 6;

FIG. 10 is a circuit diagram of a third implementation of the switch circuit component of the control system of the present invention for use in the diversity antenna system of FIG. 9; and FIG. 11 is a circuit diagram of a fourth implementation of the switch circuit component of the control system of the present invention for use in the diversity antenna system of FIG. 9.

DESCRIPTION OF THE PREFERRED EMBODIMENT(S)

With reference to FIGS. 3-11, a control system and method is herein described, shown, and otherwise disclosed in accordance with the preferred embodiment(s) of the present invention. Broadly, the control system and method allow a radio receiver to switch between and among two or more antennas in order to select the particular antenna providing the strongest signal, thereby improving overall reception. In contrast to prior art control systems, such as those shown in FIGS. 1 and 2, the present invention does not require a multiplicity of cables resulting from separate cables extending between and operatively connecting the receiver with each of the antennas. Instead, the present invention links the receiver and antennas with a single cable, and uses minor changes or perturbations in the voltage level of a DC power signal carried on the single cable to accomplish selection of the particular antenna providing the best reception.

Figure 5:
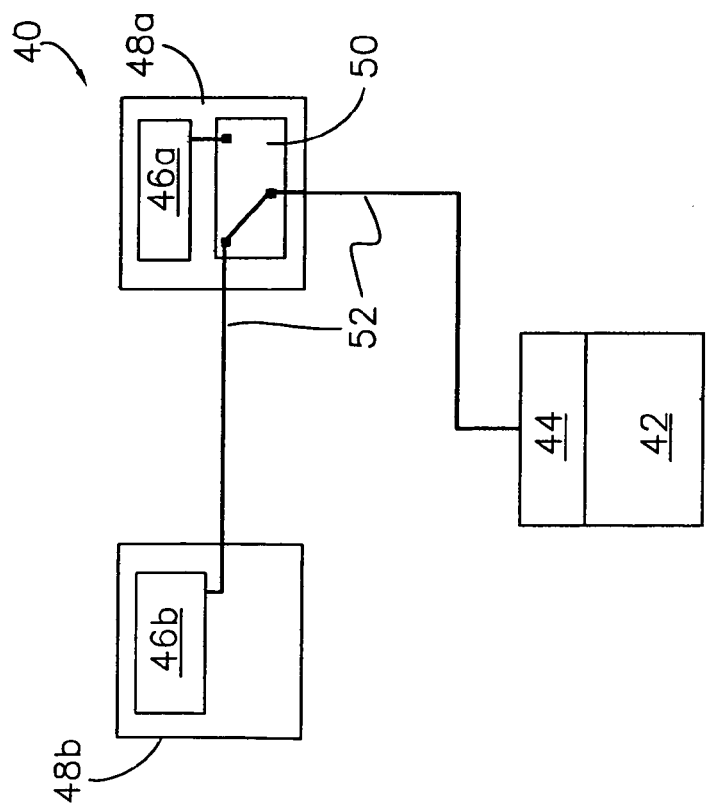
FIG. 5 is a high-level block circuit diagram of the first diversity antenna system of FIG. 3.

Referring to FIGS. 3 and 5, the control system of the present invention may be adapted for use in a first diversity antenna system 40 comprising a radio receiver 42, including a radio head unit 44; multiple antennas 46a,46b, with each antenna 46a,46b being located in a different antenna module 48a,48b; a switch circuit 50; and a single cable 52 connecting the radio head unit 44 and the antenna modules 48a,48b using a daisy-chain architecture.

Figure 6:
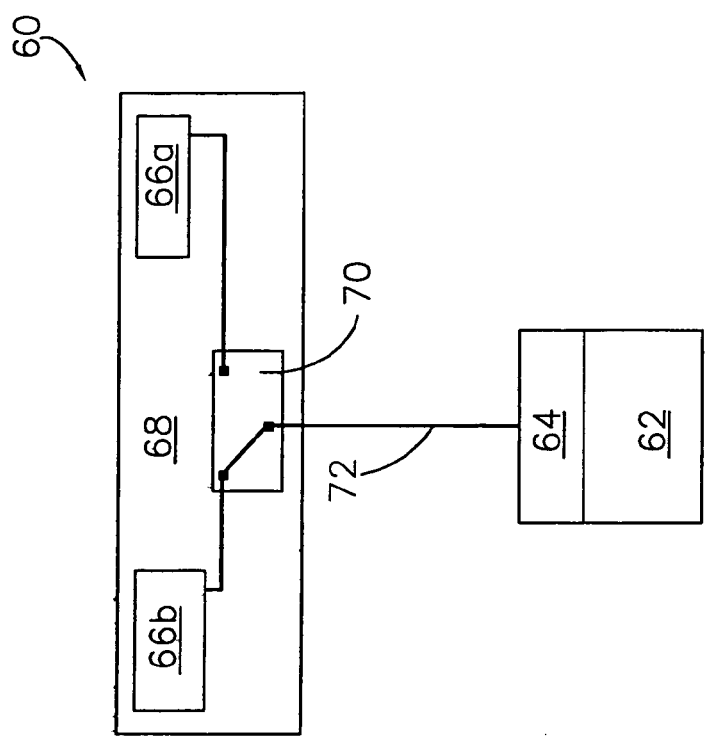
FIG. 6 is a high-level block circuit diagram of the second diversity antenna system of FIG. 4.

Alternatively, referring to FIGS. 4 and 6, the control system of the present invention may be adapted for use in a second diversity antenna system 60 comprising a radio receiver 62, including a radio head unit 64; multiple antennas 66a,66b, co-located in a single antenna module 68; a switch circuit 70; and a single cable 72 connecting the radio head unit 64 and the antenna module 68.

The diversity antenna systems 40,60, apart from the control system components of those systems 40,60, are substantially conventional in form and function. Thus, the radio receivers 42,62 and antennas 46a,46b,66a,66b, for example, which play no new role with regard to the control system of the present invention, are substantially conventional and will not be discussed in detail. Furthermore, the following discussion applies to the control system generally, independent of the particular diversity antenna system architecture with which it is used, except as noted. In that light, reference will generally be made to the diversity antenna system 40 of FIGS. 3 and 5, but it should be understood that the discussion applies equally to the diversity antenna system 60 of FIGS. 4 and 6.

The radio head unit 44 is adapted to determine, based on a bit error rate of an RF signal received from a currently-selected one of the antennas 46a,46b, whether the currently selected antenna 46a,46b is providing a signal of acceptable quality, and, if the antenna 46a,46b is not, to generate a control signal to cause the switch circuit 50 to switch to the other antenna 46a,46b. More specifically, the radio head unit 44 determines and compares the actual bit error rate to a pre-established threshold bit error rate value, and, if the threshold value is exceeded, indicating unacceptably low signal quality, generates the control signal to switch antennas.

The control signal is provided as a minor change or perturbation in a voltage level of a DC power supply signal provided via the single cable 52 to the antenna modules 48a,48b. Prior art control systems are capable of determining bit error rates and generating control signals for controlling switching, though none generate a control signal that takes the form of changes in the DC power supply signal. Electronic circuitry for adapting the radio head unit to generate such a control signal as is used by the present invention can vary greatly and is, in any event, considered to be within the ability of one with ordinary skill in the relevant art to design and construct given the present disclosure.

The switch circuit 50 detects the control signal and switches between and among the antennas 46a,46b. Referring also to FIG. 7, the switch circuit 50 broadly includes an RF switch 80 and a switch controller 82. The RF switch 80 is preferably a single-pull, double-throw switch that switches in response to a switch signal provided by the switch controller 82. The switch controller 82 outputs the switch signal to the RF switch 80 in the form of a transistor-transistor logic (TTL) signal, and may be implemented to provide the switch signal either as a steady change in voltage level, as does the first implementation of the switch circuit 50 shown in FIG. 7, or as a pulse, as does the second implementation of the switch circuit 150 shown in FIG. 8.

The switch controller 82 includes a voltage limiting device 84; a current amplifying device 86; a bias resistor 88; and an inductor 90. The voltage limiting device 84 and the current amplifying device 86 extract the control signal from the DC power supply signal carried on the single cable 52 from the radio head unit 44. This can be accomplished, for example, using a Zener diode as the voltage limiting device 84 and a bipolar transistor as the current amplifying device 86. The Zener diode clamps the voltage at a level that is just above the power supply voltage for the antenna modules 48a,48b. If a small signal, i.e., the control signal, is added to this power supply voltage, it will cause a current to flow through the Zener diode so that the voltage is kept constant for use by the antenna modules 48a,48b. This current is sensed in the bipolar transistor which acts as a sensitive switch. When the bipolar transistor turns on and off, it, in combination with the bias resistor 88, provides a large voltage swing. This large voltage swing actuates the RF switch 80. The inductor 90 is used as an RF choke to block the RF signal. The RF signal and DC power supply signal need not be separated using filters because many of the other components of the antenna module (e.g., RF amplifiers) can be powered through a DC signal on the output terminal.

In the first implementation of the switch circuit 50, shown in FIG. 7, the steady presence of the switch signal causes selection of a particular one of the antennas 46a,46b, and the steady absence of the switch signal causes selection of the other antenna 46a,46b. In the second implementation of the switch circuit 150, shown in FIG. 8, the switch signal is provided in the form of a pulse, and reception of the pulse causes the RF switch 80 to switch antennas. This latter implementation is achieved using an electronic latch 192 to capture or remember the pulse.

The single cable 52 carries the received RF signals from the antenna modules 46a,46b to the radio head unit 44, and carries the DC power supply signal, including the control signal, from the radio head unit 44 to the antenna modules 48a,48b.

Figure 9:
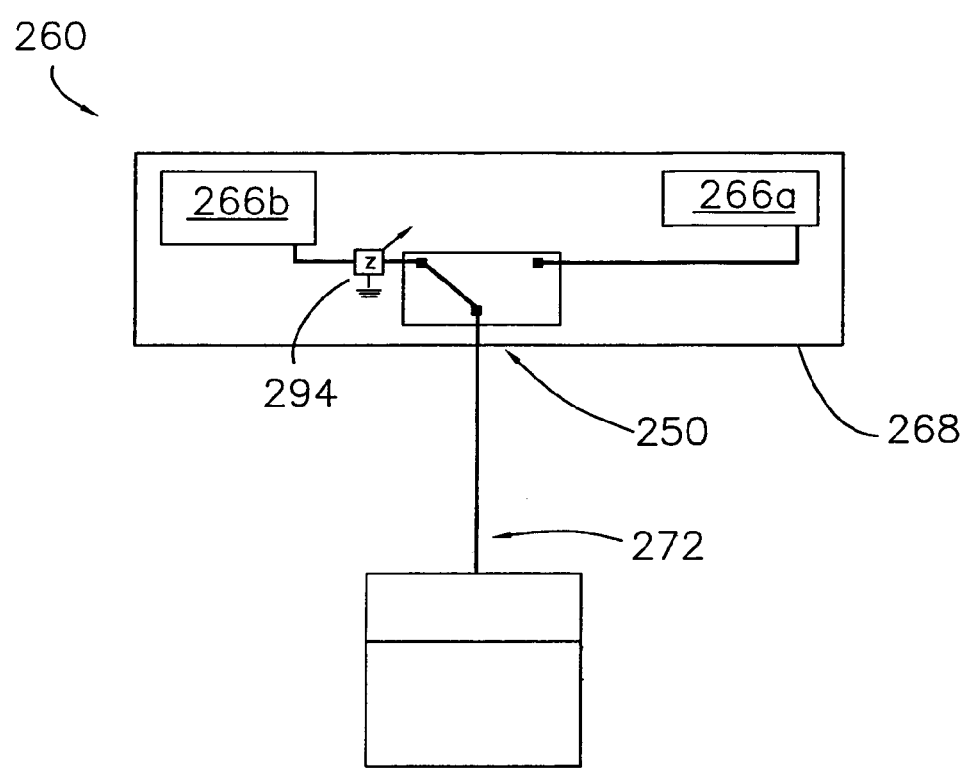
FIG. 9 is a high-level block circuit diagram of an alternative embodiment of the second diversity antenna system of FIG. 4.

Referring to FIGS. 9, 10, and 11, an alternative embodiment of the second diversity antenna system 60 of FIG. 6 allows for an extremely compact solution. The alternative embodiment is substantially similar or identical to the preferred first embodiment but for the following differences. The diversity antenna system 260 comprises a main, driven, or first antenna 266a and a parasitic or second antenna 266b co-located in a single antenna module 268. Within the switch circuit 250, the RF switch 80 is replaced by a variable impedance device 294, such as a varactor diode, which is used to change the radiation pattern. The single cable 272 is connected only to the main antenna 266a, and the parasitic antenna 266b, which serves as a director, is connected to the variable impedance device 294. When the switch signal from the transistor 284 (or, in the case of a fourth implementation of the switch circuit 350, from the latch 392) is applied to the variable impedance device 294, the reflection phase of the parasitic antenna 266b is changed, and its coupling coefficient to the main antenna 266a is also changed, which changes the radiation pattern, thereby accomplishing the desired switching without use of the RF switch 80.

A preferred control circuit which can be used with both preferred embodiments, discussed above, is described as follows. The control circuit switches from one antenna to another using a bias voltage which is generated in the receiver by a voltage switch power supply. The switching decision is made at the receiver. Two control voltages, e.g., 7 Volts and 9 Volts, are generated, each corresponding to a different one of the antennas. More specifically, the first control voltage of 7 Volts enables antenna module A, and the second control voltage of 9 Volts enables antenna module B. Though pulse control can be used to control switching, voltage control provides higher noise immunity and positive selection of either antenna module, rather than a simple toggle function, which can be advantageous in certain designs.

The control circuit includes two low noise amplifiers (LNAs) which are always on, thereby advantageously eliminating thermal tailing or impedance mismatching. The LNAs are terminated in the RF switch (50 Ohms), and are powered with 5 Volts regardless of the control voltage range. A +5 Volt surface mount regulator is used to regulate the 7 Volt to 9 Volt control voltage and to provide stable +5 Volt power to both LNAs. A bias T is used to remove the DC voltage from the RF signal which is sent to the receiver. A charge pump −5 Volt regulator is used to provide bias voltage for the RF switch.

Two additional bias Ts are used to insert +5 Volts on the coaxial cable to the LNAs. These bias Ts are used to remove the RF signal from the LNAs and provide the input signal for the RF SPDT switch which terminates each of the LNAs in 50 Ohms.

The output of the RF SPDT switch is provided to the receiver via another bias T. The 7 Volt to 9 Volt control voltage is removed from the receiver coaxial cable by this bias T. The use of multiple bias Ts isolates the control voltage from the regulated +5 Volts so that the LNAs see only the regulated +5 Volts, thereby providing very stable operation.

The control voltage is processed as follows. A zener diode which is used as a level shifter along with a bias resistor feeds a Schmitt trigger. The Schmitt trigger IC contains a conventional Schmitt trigger followed by a Darlington level shifter and a phase splitter having a totem pole output. The Schmitt trigger uses positive feedback to effectively increase the speed of slow input transitions and provide different input thresholds for positive-going and negative-going transitions. This hysteresis between positive-going and negative-going input thresholds (typically 800 mV) is determined internally by resistor ratios and is essentially insensitive to temperature and supply voltage variations. The input signal to the Schmitt trigger is the control voltage which varies from 7 to 9 Volts. The TTL output of the Schmitt trigger drives the SPDT RF switch control input.

The control circuit is preferably constructed using surface mount parts mounted on an approximately 1 inch square substrate, and mounted in the antenna base. Tests of the switching speed of the control circuit reveal a switching speed of approximately 15 nanoseconds, with no overshoots or undershoots.

Contemplated useful applications of the present invention include, but are not limited to, diversity switching for improved antenna performance, and low-cost diversity for vehicle communication systems.

From the preceding discussion it will be understood and appreciated that the present invention provides a number of advantages over the prior art, including, for example, using a single cable rather than multiple cables, which facilitates packaging and installation, including reducing problems associated with routing cables. Use of a single cable also lowers costs, particularly costs associated with the total length of cable needed to connect the receiver and antenna modules. Use of a single cable also eliminates multiple RF antenna connectors at the receiver.

Although the invention has been described with reference to the preferred embodiments illustrated in the drawings, it is noted that equivalents may be employed and substitutions made herein without departing from the scope of the invention as recited in the claims. For example, although described herein for illustrative purposes as being adapted for use in a vehicle, such as an automobile, it should be understood and appreciated that the present invention is not limited to this particular use or application. Furthermore, although described herein as involving two antennas, the control system is readily adaptable for use with more than two antennas using, for example, multiple switch circuits or switch circuits with more than two possible states.

The invention claimed is:

1. A control system for selectively controlling switching in a diversity antenna system, the control system comprising:
   a radio head unit alternatively coupled to first and second antennas, and configured to:
      deliver a DC power supply signal to and receive a return signal from a selected one of the antennas,
      determine a signal quality of the received return signal based on a determined actual bit error rate, and
      generate a control signal when a pre-established threshold bit error rate value is exceeded by modifying the DC power supply signal, wherein said control signal is operable to cause the radio head unit to switch from the selected one of the antennas to the other of the antennas, when the signal quality of the received signal exceeds a pre-established threshold value;
   a switch circuit intermediately and communicatively coupled between the unit and each of the antennas, wherein the circuit includes an RF switch and a switch controller having a voltage limiting device and a current amplifying device, and is configured to receive the control signal and toggle between the first and second antennas, so that the radio head delivers the DC power supply signal and receives a return signal from the other of the antennas; and
   a single daisy chain cable interconnecting the radio head unit to the switch circuit, so as to carry the received signal and the control signal therebetween.

2. The control system as set forth in claim 1, wherein the control signal is a steady change in the DC power supply signal.

3. The control system as set forth in claim 1, wherein the control signal is a pulse change in the DC power supply signal, and the switch circuit includes an electronic latch that is switched as a result of the pulse change.

4. The control system as set forth in claim 1, wherein the switch circuit is located in an antenna module with the first antenna and includes an RF switch and a switch controller, the RF switch is a single-pull, double-throw switch that switches in response to a switch signal provided by the switch controller, and the switch signal is a transistor-transistor logic signal.

5. The control system as set forth in claim 1, wherein the switch circuit is located in an antenna module with the first and second antennas.

6. A diversity antenna system, having closed loop feed back control, said system comprising:
   first and second antennas;
   a radio head unit communicatively coupled to the first antenna, adapted to determine a signal quality of a received signal provided by the first antenna, and to generate a control signal for switching from the first antenna to the second antenna when the signal quality of the received signal exceeds a pre-established threshold value;
   a switch circuit including a single RF switch, a Schmitt trigger having a Darlington level shifter, and Zener diode, and adapted to receive the control signal and to switch to the second antenna only upon receipt of the control signal; and
   a single cable adapted to connect the radio head unit to the switch circuit and to carry the received signal, the control signal, and a DC power supply signal therebetween,
   said unit including a control circuit having a plurality of low noise amplifiers operable to eliminate thermal tailing and impedance mismatching.

7. The diversity antenna system as set forth in claim 6, wherein the radio head unit determines the signal quality of the received signal based on a determined actual bit error rate, such that when a pre-established threshold bit error rate value is exceeded, the control signal is generated to switch to the second antenna.

8. The diversity antenna system as set forth in claim 6, wherein the control signal is a change in the DC power supply signal carried on the single cable.

9. The diversity antenna system as set forth in claim 8, wherein the control signal is a steady change in the DC power supply signal.

10. The diversity antenna system as set forth in claim 8, wherein the control signal is a pulse change in the DC power supply signal, and the switch circuit includes an electronic latch that is switched as a result of the pulse change.

11. The diversity antenna system as set forth in claim 8, wherein the switch circuit and the first antenna module are both located in a first antenna module, and the second antenna is located in a second antenna module that is spaced apart from the first antenna modules, and the radio head unit, the first antenna module, and the second antenna module are connected by the single cable using a daisy chain architecture.

12. The diversity antenna system as set forth in claim 8, wherein the switch circuit, the first antenna, and the second antenna are all located in a single antenna module.

13. A method of controlling switching in a diversity antenna system, the method comprising the steps of:
   (a) connecting a radio head unit to a first antenna module having a first antenna and a second antenna module having a second antenna with a single cable using a daisy chain architecture;
   (b) determining a signal quality of a received signal provided by a first antenna and carried on the single cable;
   (c) generating a control signal for switching from the first antenna to the second antenna when the signal quality of the received signal is below a pre-established threshold value, and wherein the control signal is a change in a DC power supply signal that is also carried on the single cable;
   (d) receiving the control signal at a switch circuit located in the first antenna module with the first antenna; and
   (e) switching from the first antenna to the second antenna in response to the control signal.

14. The method as set forth in claim 13, wherein determining the signal quality of the received signal is based on an actual bit error rate, such that when a pre-established threshold bit error rate value is exceeded by the actual bit error rate, the control signal is generated to switch to the second antenna.

15. The method as set forth in claim 13, wherein the generated control signal is a steady change in the DC power supply signal.

16. The method as set forth in claim 13, wherein the generated control signal is a pulse change in the DC power supply signal, and the switch circuit includes an electronic latch that is switched by the pulse change.

* * * * *